Aug. 4, 1959  E. SHOHAN  2,898,128
VALVE
Filed Nov. 26, 1954  4 Sheets-Sheet 1

INVENTOR.
ELLIOT SHOHAN
BY
*J. F. Cuneo*
ATTORNEY

Aug. 4, 1959
E. SHOHAN
2,898,128
VALVE
Filed Nov. 26, 1954
4 Sheets-Sheet 2
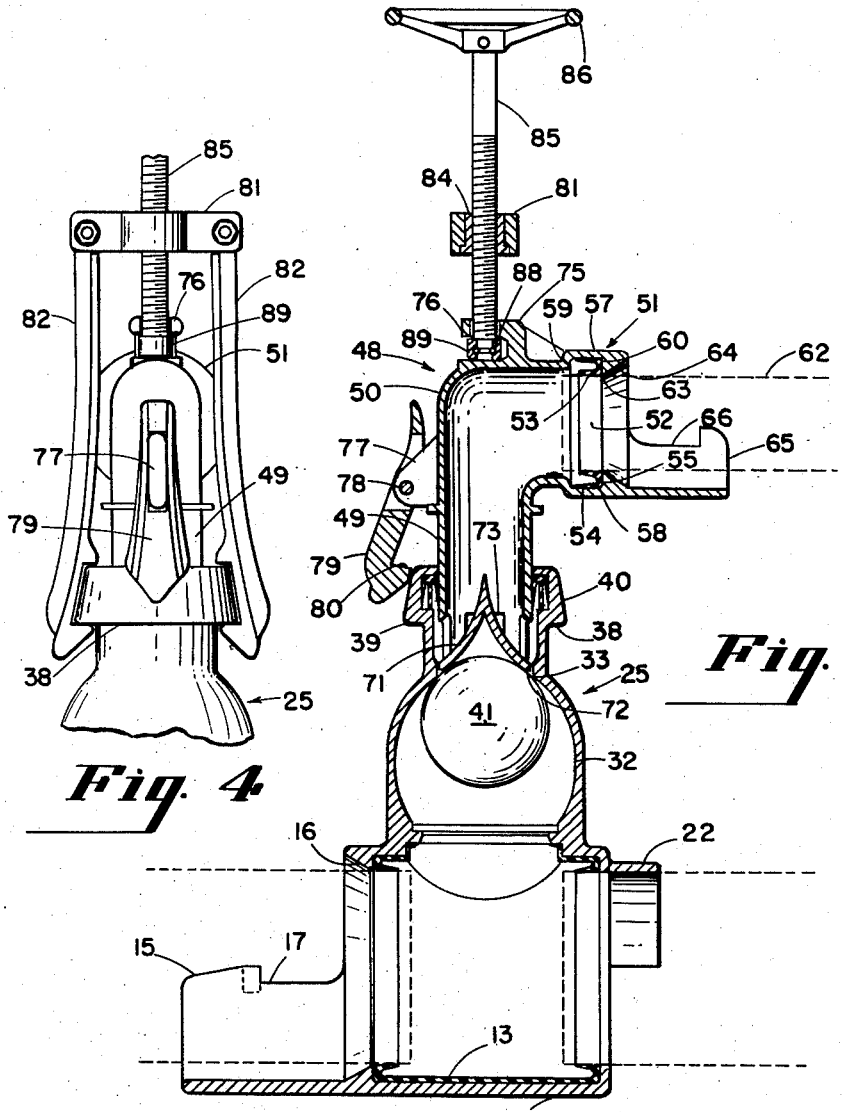
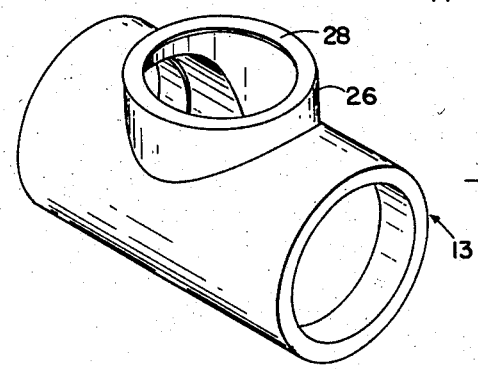
INVENTOR.
ELLIOT SHOHAN
BY
*J. F. Cuneo*
ATTORNEY Aug. 4, 1959 E. SHOHAN 2,898,128
VALVE
Filed Nov. 26, 1954 4 Sheets-Sheet 3

INVENTOR.
ELLIOT SHOHAN
BY
J. F. Cuneo
ATTORNEY

Aug. 4, 1959     E. SHOHAN     2,898,128
VALVE
Filed Nov. 26, 1954     4 Sheets-Sheet 4
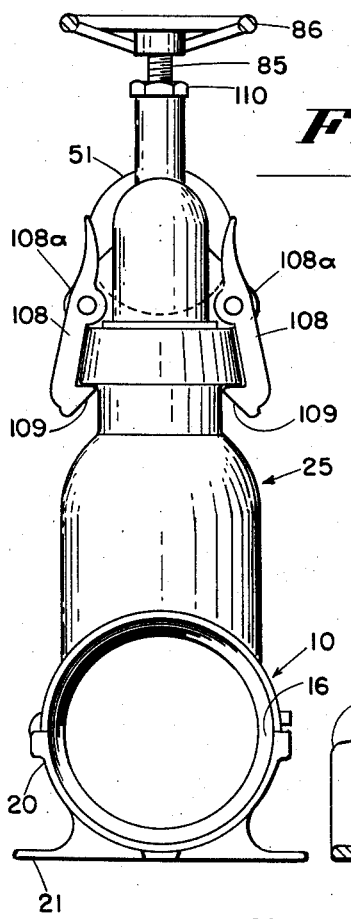
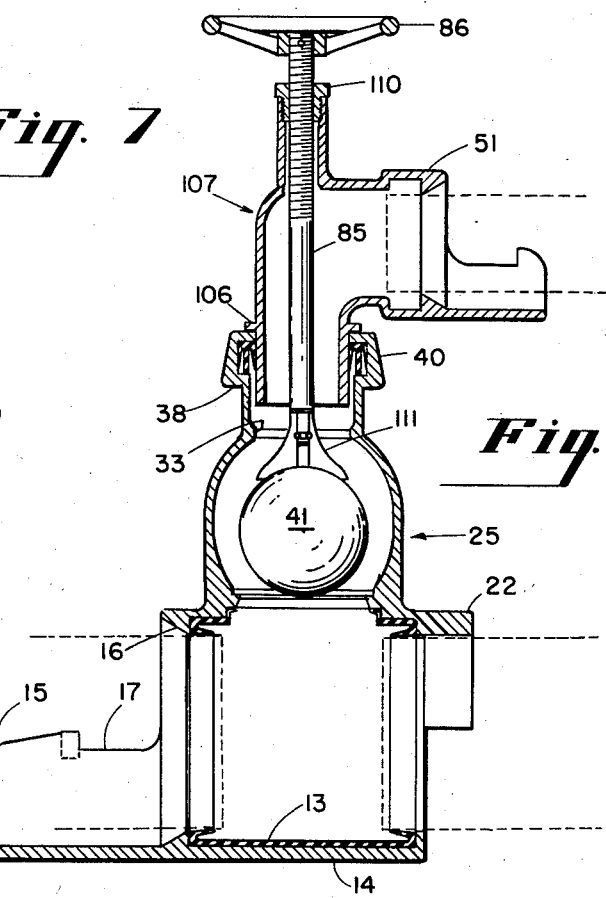
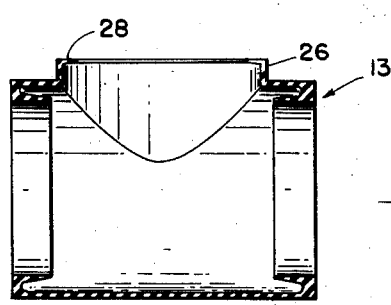
INVENTOR.
ELLIOT SHOHAN
BY
*J. F. Cuneo*
ATTORNEY

United States Patent Office 2,898,128
Patented Aug. 4, 1959

2,898,128

VALVE

Elliot Shohan, San Bernardino, Calif.

Application November 26, 1954, Serial No. 471,397

9 Claims. (Cl. 284—17)

This invention relates to valves for controlling the flow of liquids in pipe lines and in particular to a novel light weight valve adapted for use with thin walled pipe or tubing such as is customarily employed in temporary pipe lines or systems used for irrigating, mining and related operations.

Irrigation lines are usually required to transmit large volumes of water and are generally large in diameter. A conventional valve capable of handling the flow in such lines would be heavy, expensive and would be subject to damage from rough usage. This type of valve is usually connected to the line by means of threads, or if the pipe is large, by means of flanges and gaskets. Since the pipe used in irrigation lines is generally thin walled and made of light metal, either of the above methods of coupling the valve to the pipe would be impractical.

Conventional valves of the globe or gate type also require that the seat and closure member of the valve be lapped or ground together to insure a leakproof seal. Lapped or ground seats are subject to wear and corrosion and require frequent servicing. Whenever the closure member is badly worn a new closure element must be lapped or ground to the seat. This requires considerable time and care and if the seat has been damaged the entire valve must usually be replaced. Due to the foregoing it is apparent that conventional valves are not desirable for use in portable irrigation systems where the lines and valves must be quickly assembled and taken down.

My present invention provides a novel valve that is light in weight, simple in construction, rugged, requires no threaded or flanged connections to the pipe, can handle large volumes of water, is compact and requires little or no servicing to insure satisfactory operation. The closure member of my novel valve can be easily replaced and requires no grinding or lapping. For use in connection with lightweight temporary pipe the valve is associated with a quick connecting coupler of the type described in my prior patent application Serial No. 448,469, filed August 9, 1954. The valve may also be associated with any other suitable form of coupler that is designed to be used with thin walled pipe or may be provided suitable means for connecting it to a heavy wall steel conduit. When a coupler of the type described in the aforesaid patent application is employed, one opening of the coupler portion is secured to a length of pipe. The other end of the coupler is provided with means permitting quick connection of the end of a pipe length by simply inserting the pipe end into the opening in the coupler.

My novel valve, when attached to such a coupler device, may be installed at any desired position in a pipe line and will serve to control the flow of water from the main line into lateral lines which are connected to the discharge from the valve. The valve utilizes a removable male pipe outlet fitting which may be inserted into the valve outlet and when forced against the closure member of the valve by a suitable valve stem and wheel combination, dislodges the closure member from its seat and permits water to flow from the main into the male outlet fitting. The hand wheel and stem allow the flow of water into the lateral lines to be metered thus avoiding drastic pressure drops that would occur if the water in the main line were suddenly released into empty lateral lines by suddenly opening the valve to permit maximum flow.

The outer end of the male pipe outlet fitting is preferably provided with a quick connecting coupler element similar to the coupler described in the above mentioned patent application. Such a coupler permits the use of light weight thin walled tubing or pipe for the lateral lines.

It is a purpose of this invention to provide a valve adapted for use with light weight, thin walled pipe of any desired diameter that is light, rugged, simple in construction, inexpensive to manufacture and requires little or no maintenance to keep it operating satisfactorily.

Another purpose of my invention is to provide a valve suitable for use in irrigation lines of the type contemplated, in which a new closure member can be installed when the old one is worn out or damaged and will not require grinding or lapping with the seat to prevent leakage.

A further purpose of this invention is to provide a valve that does not require that the valve stem and hand wheel combination, or equivalent means for dislodging the closure member from the seat, be made a permanent portion of the valve; the valve stem and wheel combination being attachable to the valve housing whenever it is required that the valve be opened or throttled, and may be detached from the valve to be used in connection with other similar valves whenever the valve is in closed or fully open position.

Another purpose of this invention is to provide a valve that employs the male fitting which serves as the outlet from the valve, to dislodge the closure member from the seat whenever it is inserted into the outlet passageway of the valve housing and forced against the closure member.

An added purpose of this invention is to provide a valve housing and insertable male outlet fitting that will provide streamline flow of water passing through the housing and male fitting, thereby minimizing the pressure drop that normally occurs between the inlet and discharge openings of most valves.

A related purpose of this invention is to provide a valve body and outlet passageway construction that can be simply cast, and which will require little or no machine work to insure a suitable valve unit that will operate satisfactorily.

The above and additional features of this invention will become apparent and will be more clearly understood by referring to the accompanying detailed description and illustrative drawings in which:

Fig. 3 is a cross section view of the valve with the closure member resting against the seat, having a male outlet fitting inserted in the valve outlet passageway and a detachable valve stem and hand wheel attached to the valve housing.

Fig. 4 is a partial plan view of the valve of Fig. 3, looking at the valve from the left hand side, showing one way in which the hand wheel and stem combination is attached to the upper end portion of the valve outlet passageway.

Fig. 6 is a modified embodiment of the valve using an outlet male fitting provided with a permanent hand wheel and stem.

Fig. 7 is a view looking at the left hand side of Fig. 6, showing the manner in which the male outlet fitting is secured to the valve body.

Fig. 9 is an isometric view of an inverted T-shaped gasket used in the pipe coupler when used in conjunction with the valve housing.

Fig. 10 is a cross section view of the T-shaped gasket shown in Fig. 9.

Figure 1:
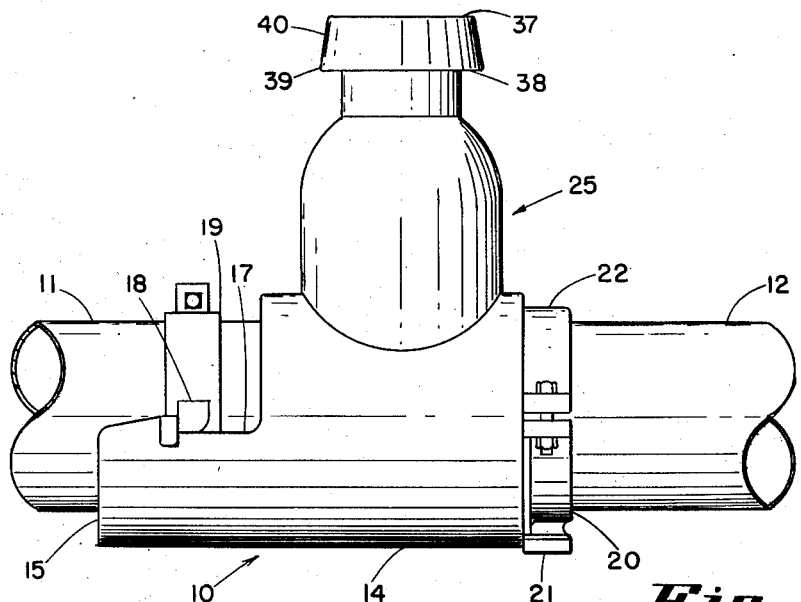
Fig. 1 is a side plan view of a valve body and outlet passageway installed in a pipe line by means of a quick connecting coupler secured to the lower portion of the valve.
Figure 2:
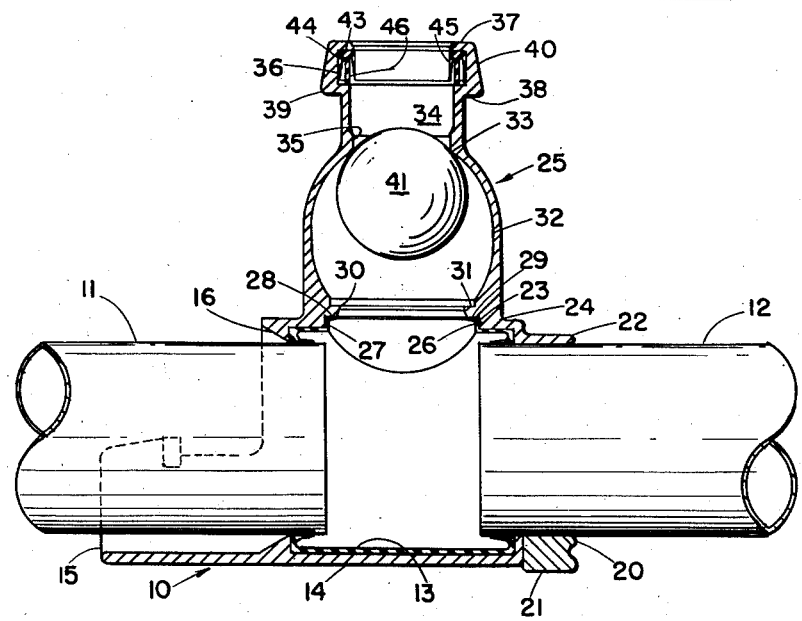
Fig. 2 is a cross section view taken on the vertical plane passing through the longitudinal axis of the valve and coupler.
Figure 5:
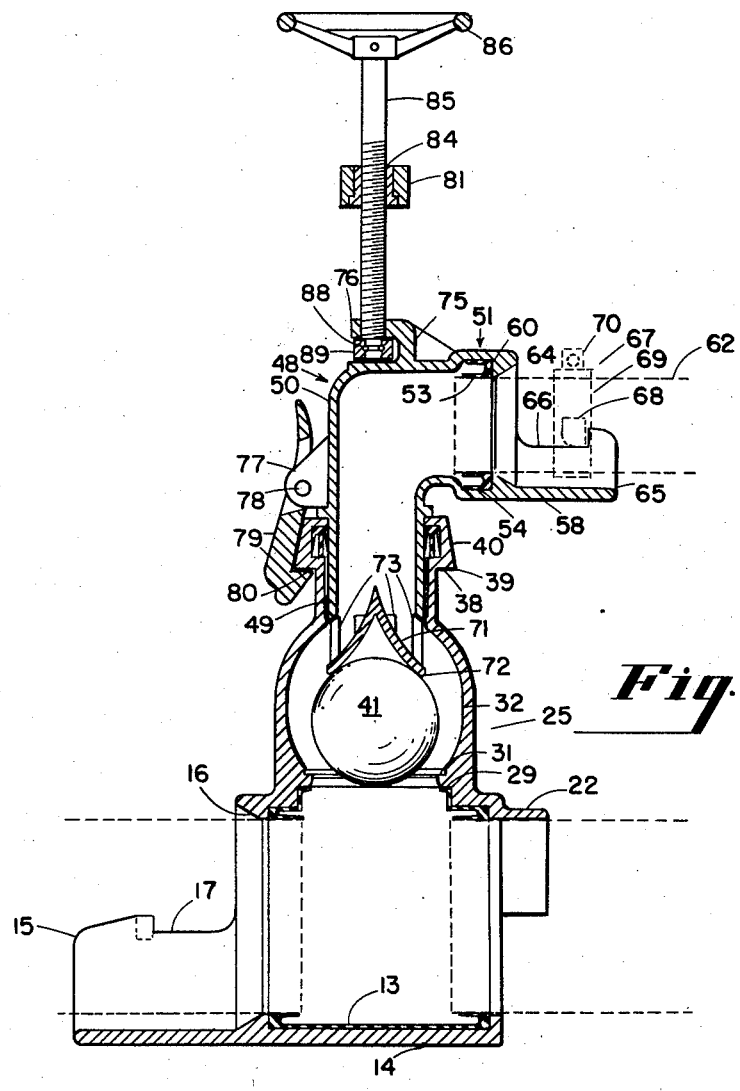
Fig. 5 is a cross section view of the valve in Fig. 3, showing the male outlet fitting depressed by hand wheel and stem to force the closure member away from the seat.

Figures 1 and 2 which are illustrative of certain embodiments of this invention, show my novel valve construction in combination with a pipe coupler 10, corresponding to the one described in my aforementioned patent application, Serial No. 448,469. The end portions of large diameter, thin walled pipes 11 and 12 are inserted in the lateral openings of substantially T-shaped gasket 13 housed in tubular body portion 14 of the coupler. Pipe coupling guide 15 extends from body 14 adjacent a ramp 16, with notches 17 provided on opposite sides of guide 15 to engage lugs 18 of cooperating coupler clamp 19, when the clamp is secured to the end portion of pipe 11. The opposite end of coupler body 14 is provided with a latch clamp 20 which, when assembled to shelflike projection 22, that extends outwardly from that end of the coupler body, serves to clamp the end of pipe 12 to the coupler.

Figure 8:
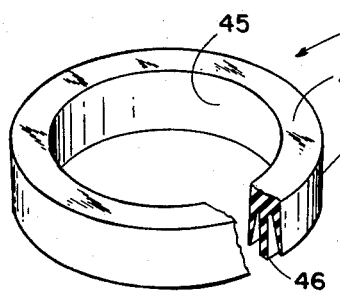
Fig. 8, is a view, partly in cross section showing one form of gasket located at the upper end of the valve housing, through which the male fitting slides.

Latch clamp 20 is provided with a foot or base 21 that supports the coupler and prevents it from rolling. All of the above-described elements are set forth in greater detail in the aforementioned patent application. It is intended that any other type of coupler capable of quickly connecting light weight, thin walled pipe together may be used at the lower end of my valve body. In some cases it is necessary to connect the valve to heavy walled pipe risers, in which case the valve is provided with a suitable connecting means of the type shown in Fig. 8, which will be described in detail later.

The upper portion of hollow body 14 of a coupler used in conjunction with a valve housing, is provided with a large opening 23 in place of the boss described in the previous patent application.

The axis of the valve housing is preferably perpendicular to the axis of the coupler body. A modified form of T-shaped gasket 13 is used when the coupler body is secured to a valve housing. The gasket is provided with a large opening 27 located at the upper portion of the gasket and corresponds with opening 23. An annulus 26 surrounds opening 27 and is dimensioned to fit snugly against the inner surface of annular projection 24 surrounding opening 23.

The outer end of annulus 26 is provided with an internal, horizontally disposed flexible lip 28 that extends toward the center a suitable distance and seats against a corresponding horizontal, annular shoulder 29 located at the upper end of annular projection 24; and is perpendicular to the axis of the valve body.

Above shoulder 29, the internal surface of the lower portion of the valve housing continues at uniform diameter for a short distance to form a cylindrical surface 30. At the upper end of cylindrical surface 30 the internal diameter of the valve body preferably increases abruptly forming a second annular shoulder 31, also horizontal to the longitudinal axis of the valve housing. Above shoulder 31 the diameter of the internal surface of the valve housing increases progressively as it extends away from the coupler portion, thus forming an enlarging curved surface attaining a maximum diameter at point 32. Beyond point 32 the diameter of the internal surface of the valve housing reduces progressively to form a curved surface of reducing diameter which merges with the seating edge 33. This edge is substantially smaller in diameter than cylindrical surface 30. The principal internal surface of the housing above cylindrical surface 30 is substantially concave.

Beyond seating edge 33, the valve housing is provided with an outlet passageway 34. The internal diameter of passageway 34 continues substantially at constant diameter for a short distance from the seating edge to form a narrow cylindrical surface 35. Above surface 35, the internal diameter of the outlet passageway increases slightly and continues at this increased diameter until it reaches an annular internal groove 36 which has its upper end located slightly below the upper end 37 of the valve housing outlet passageway. The internal diameter of the outlet passageway between the upper end of groove 36 and end 37 is preferably the same as that of seating edge 33.

The outer surface of the valve housing outlet passageway is preferably smaller in diameter than the outer diameter of the principal portion of the valve housing, and remains substantially cylindrical to a point slightly below the position corresponding to the lower edge of internal groove 36. At this point the outer diameter of the outlet passageway increases abruptly to form a horizontally disposed shoulder 38, which extends outwardly from the cylindrical portion a suitable distance to provide a surrounding wall for groove 36 and terminates at the outer edge 39. Extending upwardly from outer edge 39, the diameter of the outer surface preferably tapers between the edge 39 and upper end 37 of the valve outlet passageway to form a frusto-conical surface 40 as shown in the drawings.

A spherical closure member 41, constructed of a somewhat resilient material, for example rubber or a similar elastomer, is made slightly larger in diameter than cylindrical surface 30 so that it will require some compression to introduce it into the enlarging-reducing portion of the valve housing. Since the diameter of seating edge 33 of the housing member is smaller than that of the closure member, the closure member will seat against the edge and will not be forced into the outlet passageway 34 when it is placed under pressure. In some instances it is preferable to reenforce closure member 41 with an internal liner to prevent it from becoming deformed excessively. The closure member is preferably buoyant in water.

When the valve and the lines entering the valve are empty, the closure sphere will rest against the upper edge of cylindrical surface 30 and seal the opening preventing dirt, insects and small animals from entering the pipe.

A resilient T-shaped gasket 43 such as shown in Figs. 2, 3, 5 and 9, comprises relatively limp sides 44 and 45, and a heavier central portion 46 that is slightly longer than the sides 44 and 45. The gasket is annular and is proportioned to fit into annular groove 36 and is preferably constructed of rubber. The upper horizontal edge 47 of the gasket seats against the upper edge of the groove. The substantially vertical cylindrical surface of the T-gasket formed by inner limp side 45 has a diameter approximately the same as that of the cylindrical surface of the internal portion of the outlet passageway located below the upper end 37.

A male tubular fitting 48 adapted to be inserted into the outlet passageway of the valve housing and through annular gasket 43 serves as an outlet conduit from the valve housing. Tubular fitting 48 comprises a straight tubular portion 49 that is secured at its outer end to a fitting 50 such as an elbow, preferably a right angle elbow, or to a corresponding type of fitting such as a T or cross, if flow from the valve is to be directed into several lines. The other end of elbow 50, or each opening of a multiple opening fitting, is preferably secured to a modified coupler unit 51 which somewhat resembles the coupler unit 10 at the lower end of the valve housing.

Coupler 51 is preferably an integral portion of the elbow or similar fitting and comprises an enlarged body portion 57 which is considerably shorter than body portion 14 of coupler 10. That portion of body 57 adjoining elbow 50 is provided with an internal annular groove 58 having an inner shoulder 59 and an outer shoulder 60. Outer shoulder 60 extends toward the center a greater distance than shoulder 59 and forms an opening that is slightly larger than the outer diameter of pipe 62, which is introduced into coupler 51. Extending outwardly from shoulder 60, the internal diameter of the coupler continues at the diameter of shoulder 60 for a short distance to form a cylindrical surface 63. Beyond the outer edge of cylindrical surface 63, the internal diameter of the body portion of coupler 51 expands uniformly as it progresses toward the outer edge of the body forming a frustoconical ramp 64.

A pipe coupling guide 65, similar to coupling guide 15 of coupler 10, extends outwardly from the lower portion of the body of coupler 51. The radius of the inner surface of pipe coupling guide 65 preferably corresponds to the maximum diameter of ramp 64. The pipe coupling guide is provided with notches 66 at each upper side thereof and pipe 62 is provided with a coupler clamp 67 having lugs 68 extending outwardly from either side of a split annulus 69. The coupler clamp is secured to pipe 62 by suitable means that are capable of clamping bolting ears 70 together, such as for example a bolt and nut. Within groove 58 there is seated a resilient V-shaped gasket 52, also preferably made of rubber, having relatively limp sides 53 and 54. The back 55 of the gasket seats against the outer shoulder 60, and relatively limp side 53 engages the outer surface of the end portion of pipe 62. The difference in diameter of the inner shoulder 59 and the outer shoulder 60 permits the water under pressure to act against the limp lip of the gasket and to force lip 53 tightly against the outer surface of pipe 62 thus preventing leakage. If desired a T-shaped gasket similar to gasket 43 may be used in place of the V-shaped gasket.

The lower end of straight portion 49 of the male outlet fitting is provided with a plug 71. This plug is preferably a body generally resembling a cone and having a concave surface formed by rotation of an arc about the vertical axis, one end of the arc being located on the vertical axis and the other end remaining a constant distance from the axis at all times. Plug 71 may be solid or hollow as shown in the drawings. The base is flush with the lower end of straight portion 49. The plug may be an integral part of straight portion 49 or may be secured to the lower end of the straight portion and if hollow, forms a narrow annular surface 72 which may be smooth or provided with projecting fingers (not shown) if these are desired.

The wall of straight tubular portion 49 is provided with ports 73 extending through the wall of straight portion 49. The port is located a short distance above annular surface 72 and faces the substantially conical, concave surface of the plug. If more than one port is provided, such ports are arranged symmetrically about the circumference of straight portion 49. The ports are shown in the drawings as being rectangular, however, any other suitable outline may be employed.

The upper outer surface of elbow 50, or similar fitting, is provided with a projection 75, preferably an integral portion of the fitting, that serves to support a yoke 76. The lower outer portion of elbow 50, or equivalent fitting, adjoining the upper end of tubular portion 49, is provinded with a latch supporting ear 77, having a bore 78 to which a latch 79 is pivotally secured. The lower end of latch 79 is provided with a hooklike portion 80, adapted to engage annular shoulder 38 whenever male outlet fitting 48 is inserted into the valve passageway a sufficient distance. In the drawings the ear 77 is located at the back of the elbow for convenience, however, the ear may be positioned at any other suitable location.

Male tubular outlet fitting 48 also serves to displace closure member 41 from the seating edge when the valve is to be opened. The male fitting is inserted into the outlet passageway of the housing and rests against the closure member. When the valve is to be opened the male outlet fitting is depressed by means of a removable hand wheel and stem arrangement such as shown in Figs. 3, 4, 5 and 6. This combination comprises a cross bar 81, having long puller arms 82 pivotally mounted at each end thereof. Each puller arm 82 is provided with a hooklike portion at its free end, adapted to engage annular shoulder 38 of the valve housing. The central portion of cross bar 81 is provided with a threaded bushing 84 which receives threaded stem 85. A handwheel 86 is secured to the upper end of stem 85. The lower end of threaded stem 85 is reduced in diameter and a cylindrical member 89 is mounted on the reduced end of stem 85 and is free to rotate on bearings 88. Cylindrical member 89 is proportioned to fit between the upper surface of the fitting and the lower surface of yoke 76 and is larger in diameter than stem 85. Cylindrical member 89 serves to raise and lower the male outlet fitting as required.

Occasionally it may be desirable to employ a male outlet fitting that remains stationary once it is inserted in the outlet passageway. One form of such construction is shown in Figs. 6 and 7. The male outlet fitting is inserted into the outlet passageway until stops 106 rest against the housing. Outlet fitting 107 is provided with ears 108a on which are pivotally secured latching arms 108 having hooks 109 to engage horizontal shoulders 38. The upper end of fitting 107 is provided with threaded bushing 110 which receives the threads of stem 85. The lower end of stem 85 is provided with a closure depressing member 111 that cradles the upper portion of the sphere. Depressing member 111 may be either rigidly secured to the stem or it may be pivotally mounted on the lower end of stem 85.

The manner in which the valve-coupler combination operates is as follows: The pipes are assembled to the coupler and when the valve housing and pipes are filled with water, the spherical closure member, which is preferably buoyant, will rest against the seating edge 33 and prevent water from entering the outlet passageway. When it is desired to supply water from the main line through the valve, a male outlet fitting 48 is inserted through the annulus formed by lip 53 of the T-shaped gasket and into the outlet passageway until annulus 72 rests against the top of closure member 41.

Hooks at the lower ends of puller arms 82 are made to engage shoulder 38 and stem 85 is placed in the yoke 76 with cylindrical member 89 located between the lower surface of the yoke and the upper end of fitting 50. The hand wheel is turned until hooks 83 become snugly tight against shoulder 38. Further turning of the handwheel causes cylindrical member 89 to force the annular end of male outlet fitting 48 to dislodge the closure member from the valve seat allowing water to enter the partially or fully exposed ports 73. The ports may be opened any desired amount thus permitting a throttling action similar to that possible in conventional valves.

When the valve is wide open, ports 73 will extend fully into the convex portion of the valve housing and the male outlet fitting may be locked in open position by means of latch 79. The stem and handwheel can be disconnected if desired, and are available for use on another valve that requires opening or throttling. The pressure of the water acts against the flexible sides of the gaskets and forces them tightly against their cooperating surfaces to prevent leakage.

In my novel valve the flow of water is not subjected to any radical or abrupt change while passing through the valve housing since the channel formed between the curved inner surface of the housing and the spherical closure member, when this is in open or partially open position, remains substantially constant and the contour of the surfaces tends to promote streamline flow. The water flowing into the outlet ports of the male outlet fitting is likewise not subjected to any abrupt changes in direction or area since the plug facing the port or ports is gradually curved in the reverse direction permitting water to enter into the male outlet fitting with a minimum of disturbance. This streamline flow construction also helps to minimize the pressure drop that is normally encountered when water flows through the outlet control orifice of the conventional type of valve.

My coupler-valve assembly may be installed at any position in a portable irrigation line where it is required that water be ducted into lateral lines either for long periods of time or for short intervals. The valve is easily coupled into the line and will not affect the flow in the main line until the male outlet fitting is inserted into the outlet passageway and the closure member has been displaced from its seat. Such a system is particularly desirable in an installation where the demands at various times and locations may vary considerably.

Various alterations may be made in the details of construction without departing from the scope of the present invention as defined by the following claims.

I claim:

1. Apparatus of the character described, comprising a housing having longitudinally spaced inlet and outlet ports and a passage through which water is adapted to flow between irrigation pipe ends inserted into said ports, said housing including a side chamber communicating with a side of said passage and having an outlet opening spaced from said passage, an annular valve seat in said chamber, a ball check valve in said chamber between said passage and seat and engageable therewith to interrupt water outflow therethrough in response to upstream water pressure application to the valve, means including a discharge conduit communicating with said chamber outlet for receiving said outflow and an actuator projecting through said outlet toward the valve for engagement therewith holding the valve displaced off said seat thereby permitting said outflow, said means being adjustable to displace said actuator toward and away from the valve and against said upstream water pressure, and latch means detachably interconnecting said means and chamber.

2. Apparatus of the character described, comprising a housing having horizontally spaced inlet and outlet ports and a passage through which water is adapted to flow between irrigation pipe ends inserted into said ports, said housing including a vertically extending side chamber communicating with the side of said passage and having an outlet opening spaced above said passage, an annular valve seat in said chamber having a vertical axis, a ball check valve in said chamber axially and bodily movable upwardly therein into engagement with said seat to interrupt water outflow therethrough in response to upstream water pressure application to the valve, said valve being free to fall downwardly in the chamber away from said seat in the absence of said pressure application, means including a discharge conduit communicating with said chamber outlet for receiving said outflow and an actuator projecting downwardly through said outlet toward the valve for engagement therewith holding the valve downwardly displaced off said seat thereby permitting said outflow, said means being adjustable to displace said actuator toward and away from the valve and against said upstream water pressure, and latch means detachably interconnecting said means and chamber.

3. Apparatus of the character described, comprising a housing having horizontally spaced inlet and outlet ports and a passage through which water is adapted to flow between irrigation pipe ends inserted into said ports, said housing including a vertically extending side chamber communicating with the side of said passage and having an outlet opening spaced above said passage, an annular valve seat in said chamber having a vertical axis, a ball check valve in said chamber axially and bodily movable upwardly therein into engagement with said seat to interrupt water outflow therethrough in response to upstream water pressure application to the valve, said valve being free to fall downwardly in the chamber away from said seat in the absence of said pressure application, means including a discharge conduit communicating with said chamber outlet for receiving said outflow and an actuator projecting downwardly through said outlet toward the valve for engagement therewith holding the valve downwardly displaced off said seat thereby permitting said outflow, said actuator and conduit being integral and said means including a plug at the lower end of said conduit forming therewith a plurality of reduced size passages through which said outflow is adapted to pass when said valve is displaced off said seat, said means being adjustable to displace said actuator toward and away from the valve and against said upstream water pressure, and latch means detachably interconnecting said means and chamber.

4. The invention as defined in claim 3 in which said plug is upwardly tapered within said conduit and forms an upward recess into which a portion of said ball is receivable.

5. The invention as defined in claim 4 in which said conduit is axially elongated and in which said conduit and plug are axially bodily movable upwardly away from said ball so as to permit the ball to engage said seat.

6. The invention as defined in claim 2 in which said actuator includes an axially elongated rod and is axially bodily movable relative to said conduit.

7. The invention as defined in claim 3 in which said means includes an axially elongated rod carried by said conduit at the outside thereof and rotatable relative thereto, a hook detachably connected with said chamber, and a threaded connection between said hook and rod whereby turning of the rod advances said conduit and plug downwardly in said chamber outlet.

8. Apparatus of the character described, comprising a housing having horizontally spaced inlet and outlet ports and a passage through which water is adapted to flow between irrigation pipe ends inserted into said ports, said housing including a vertically extending side chamber communicating with the side of said passage and having an outlet opening spaced above said passage, an annular valve seat in said chamber having a vertical axis, a ball check valve in said chamber axially and bodily movable upwardly therein into engagement with said seat to interrupt water outflow therethrough in response to upstream water pressure application to the valve, said valve being free to fall downwardly in the chamber away from said seat in the absence of said pressure application, means including a discharge conduit communicating with said chamber outlet for receiving said outflow and an actuator projecting downwardly through said outlet toward the valve for engagement therewith holding the valve downwardly displaced off said seat thereby permitting said outflow, said conduit comprising an elbow having its entrance end downwardly received in said chamber outlet, said means being adjustable to displace said actuator toward and away from the valve and against said upstream water pressure, and latch means detachably interconnecting said means and chamber, said chamber including an annular flange extending about said outlet and engaging said latch means, said elbow projecting downwardly through said flange, and an annular seal retained between said flange and elbow for engagement therewith in response to water pressure application to said seal.

9. Apparatus of the character described, comprising a housing having horizontally spaced inlet and outlet ports and a passage through which water is adapted to flow between irrigation pipe ends inserted into said ports, said housing including a vertically extending side chamber communicating with the side of said passage and having an outlet opening spaced above said passage, an annular valve seat in said chamber having a vertical axis, a ball check valve in said chamber axially and bodily movable upwardly therein into engagement with said seat to interrupt water outflow therethrough in response to upstream water pressure application to the valve, said valve being free to fall downwardly in the chamber away from said seat in the absence of said pressure application, means including a discharge conduit communicating with said chamber outlet for receiving said outflow and an actuator projecting downwardly through said outlet toward the valve for engagement therewith holding the valve downwardly displaced off said seat thereby permitting said outflow, said conduit comprising an elbow having its entrance end downwardly received in said chamber outlet, said means being adjustable to displace said actuator toward and away from the valve and against said upstream water pressure, and latch means detachably interconnecting said means and chamber, irrigation pipe ends inserted into said housing ports, means coupling said pipes to said housing against horizontal dislodgement therefrom and a tubular rubber seal in said housing covering the entire inside thereof between said pipe ends and engageable with said pipes, said seal having ports through which said pipe ends are inserted and having a side outlet opening to said chamber.

References Cited in the file of this patent

UNITED STATES PATENTS

| Number | Name | Date |
| --- | --- | --- |
| 373,256 | Traver et al. | Nov. 15, 1887 |
| 628,285 | Reaume | July 4, 1899 |
| 667,096 | Lippincott | Jan. 29, 1901 |
| 833,143 | Wolf | Oct. 9, 1906 |
| 1,124,933 | McCumber | Jan. 12, 1915 |
| 2,208,286 | Berger | July 16, 1940 |
| 2,286,623 | Kellaher | June 16, 1942 |
| 2,354,255 | Gillum | July 25, 1944 |
| 2,386,270 | Samiran | Oct. 9, 1945 |
| 2,441,363 | Kruger | May 11, 1948 |
| 2,615,741 | Nathan | Oct. 28, 1952 |
| 2,643,147 | Funkhouser | June 23, 1953 |
| 2,660,493 | Flick | Nov. 24, 1953 |
| 2,692,151 | Melato | Oct. 19, 1954 |

FOREIGN PATENTS

| Number | Country | Date |
| --- | --- | --- |
| 12,572 | Great Britain | Sept. 16, 1887 |
| 272,663 | Switzerland | Mar. 16, 1951 |